United States Patent Office 3,250,783
Patented May 10, 1966

3,250,783
NOVEL PYRROLO (1,2-α) INDOLES
William Alan Remers, Suffern, and Reta Helen Roth, Bronx, N.Y., and Martin Joseph Weiss, Oradell, N.J., assignors to American Cyanamid Company, Stamford, Conn., a corporation of Maine
No Drawing. Filed Sept. 21, 1964, Ser. No. 398,052
13 Claims. (Cl. 260—319)

This invention relates to new organic compounds and, more particularly, is concerned with novel substituted pyrrolo[1,2-a]indoles which may be represented by the following general formula

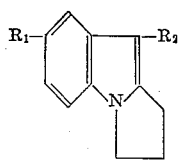

wherein $R_1$ is hydrogen, hydroxy, lower alkoxy or phenyl lower alkoxy and $R_2$ is β-nitrovinyl or β-aminoethyl. Suitable lower alkoxy groups contemplated by the present invention are those having up to about 6 carbon atoms. Suitable phenyl lower alkoxy groups contemplated by the present invention are, for example, benzyloxy, phenethoxy, etc.

The novel compounds of the present invention are obtainable as crystalline materials having characteristic melting points and absorption spectra. They are appreciably soluble in many organic solvents such as lower alkanols, acetone, ethyl acetate and the like. They are, however, generally insoluble in water.

The numbering system for the ring positions of the novel compounds of the present invention may be indicated as follows:

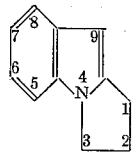

The novel substituted pyrrolo[1,2-a]indoles of the present invention are useful as antimicrobial agents and are useful in vitro against a variety of microorganisms including gram-positive and gram-negative bacteria and fungi. Typical compounds of the invention inhibit growth in vitro of such organisms as *Mycobacterium smegmatis* ATCC 607, *Staphylococcus aureus* ATCC 6548P, *Streptococcus faecalis* ATCC 8043 and *Bacillus subtilis* ATCC 6633.

The novel compounds of the present invention may be prepared by the series of reactions set forth in the following reaction scheme:

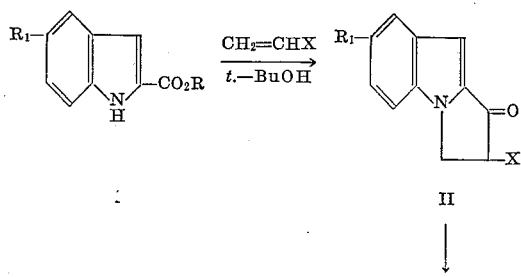

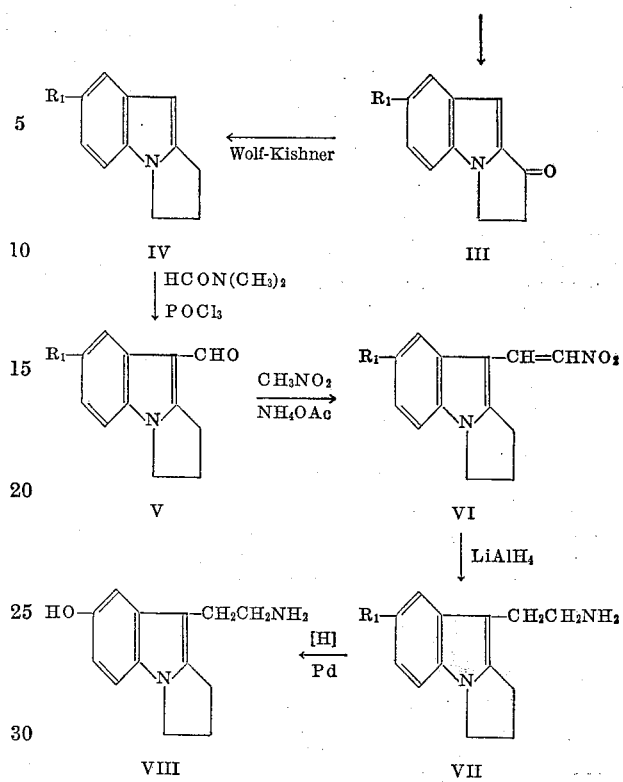

wherein $R_1$ is hydrogen, lower alkoxy or phenyl lower alkoxy. In accordance with this reaction scheme, the pyrrolo[1,2-a]indole system is obtained by condensation of a 1-unsubstituted-2-carbalkoxyindole (I) with an α,β-unsaturated carbonyl derivative such as an alkyl acrylate, in the presence of a basic catalyst such as potassium t-butoxide, thus affording a pyrroloindole β-keto ester (II). Such a β-keto ester, on heating with acid, preferably 95% acetic acid, undergoes decarbalkoxylation to a 1-ketopyrrolo[1,2-a]indole (III). The 1-ketopyrrolo[1,2-a]indole (III) may be reduced to the corresponding pyrrolo[1,2-a]indole (IV) by the Wolf-Kishner procedure. Formylation of the pyrrolo[1,2-a]indole (IV) by treatment with phosphorous oxychloride and dimethylformamide affords the corresponding 9-formylpyrrolo[1,2-a]indole (V). The 9-formyl group may be readily converted to a 9-β-nitrovinyl group (VI) by condensation with nitromethane in the presence of a catalyst such as ammonium acetate. The 9-β-nitrovinyl group may then be reduced to the corresponding β-aminoethyl group (VII) by treatment with a metal hydride such as lithium aluminum hydride. When $R_1$ is lower alkoxy, treatment of the 9-β-aminoethylpyrrolo[1,2-a]indole (VII) with a mineral acid such as hydrobromic acid gives the corresponding 7-hydroxy compound (VIII). When $R_1$ is phenyl lower alkoxy, hydrogenation of the 9-β-aminoethylpyrrolo[1,2-a]indole in the presence of a noble metal catalyst such as palladium also gives the corresponding 7-hydroxy compound (VIII).

The present invention also embraces the useful non-toxic pharmaceutically acceptable acid-addition salts of these novel compounds. Typical acid-addition salts are the hydrochlorides, hydrobromides, sulfates, citrates, tartrates, succinates, and the like. Although the novel compounds of the present invention may be used as such, they are preferably employed in the form of their non-toxic acid-addition salts which may be readily prepared by treatment with one equivalent of an acid such as hydrochloric, sulfuric, phosphoric, citric, etc. in a suitable solvent.

The invention will be described in greater detail in conjunction with the following specific examples.

EXAMPLE 1

*Preparation of ethyl 2,3-dihydro-1-oxo-1H-pyrrolo[1,2-a]indole-2-carboxylate*

To a suspension of t-butoxide (freshly prepared from 0.1 g. atom of potassium and 100 ml. of t-butyl alcohol) in 200 ml. of benzene is added 18.9 g. (0.1 mole) of ethyl 2-indolecarboxylate. The mixture is stirred several minutes and then treated with 10.0 g. (0.1 mole, 10.8 ml.) of ethyl acrylate. After the resulting mixture is stirred at reflux temperature for 3 days, it is cooled, poured into water and acidified with dilute hydrochloric acid. The benzene layer is washed with water, dried and concentrated to a viscous oil that crystallizes on addition of methanol. In this manner is obtained 11.6 g. (48%) of ethyl 2,3 - dihydro - 1 - oxo - 1H-pyrrolo[1,2-a]indole-2-carboxylate, M.P. 91–93° C.

EXAMPLE 2

*Condensation of ethyl 5-benzyloxy-2-indolecarboxylate with ethyl acrylate*

A mechanically stirred mixture of 100 g. (0.342 mole) of ethyl 5-benzyloxy-2-indolecarboxylate, 38.3 g. (0.342 mole) of potassium t-butoxide and 29.5 g. (0.342 mole, 30.6 ml.) of methyl acrylate in 2300 ml. of benzene is heated at reflux temperature for 4 days. The cooled mixture is acidified with dilute hydrochloric acid solution, whereupon all solid dissolves. The aqueous layer is extracted with methylene chloride, and the dried combined organic layers are concentrated. As a quantity of solid sufficient enough to cause bumping separates, it is removed by filtration and concentration of the filtrate is continued. In this manner the following six fractions are obtained: (a) 39.7 g. of ethyl 7-benzyloxy-2,3-dihydro-1-oxo-1H-pyrrolo[1,2-a]indole-2-carboxylate, M.P. 160–164° C.; (b) 15.4 g. of methyl 7-benzyloxy-2,3-dihydro-1-oxo-1H-pyrrolo[1,2-a]indole-2-carboxylate, M.P. 142–145° C.; (c) 2.0 g. of methyl ester, M.P. 142–145° C.; (d) 7.5 g. of starting indole ester, M.P. 160–162° C.; (e) 3.4 g. of methyl ester, M.P. 142–145° C.; and (f) 5.5 g. of starting indole ester. These amounts represent a 33% yield of ethyl ester, an 18% yield of methyl ester and a 13% recovery of starting indole ester. The ethyl ester is recrystallized three times from ethanol to give white plates, M.P. 151–153° C. A sample of methyl ester is recrystallized two times from methanol to give shining plates, M.P. 140–142° C.

EXAMPLE 3

*Preparation of 2,3-dihydro-1-oxo-1H-pyrrolo[1,2-a]indole*

A mixture of 11.16 g. (0.46 mole) of ethyl 2,3-dihydro-1-oxo-1H-pyrrolo[1,2-a]indole-2-carboxylate and 250 ml. of 95% aqueous acetic acid is stirred at reflux temperature for 22 hours. It is then cooled and diluted with water until no further crystallization occurs. The crystals are washed thoroughly with water, dissolved in methylene chloride and this solution is dried and concentrated on a steam bath as acetone is added. When the first crystals appear the solution is cooled to afford 2.13 g. of 2,3-dihydro-1-oxo-1H-pyrrolo[1,2-a]indole, M.P. 141–142° C. An additional 3.63 g. (total yield 73%), M.P. 142–144° C. is obtained by concentration of the above mother liquor with concomitant addition of hexane.

EXAMPLE 4

*Preparation of 7-benzyloxy-2,3-dihydro-1-oxo-1H-pyrrolo[1,2-a]indole*

A solution of 45.2 g. (0.13 mole) of ethyl 7-benzyloxy-2,3 - dihydro - 1-oxo-1H-pyrrolo[1,2-a]indole-2-carboxylate and 20.8 g. (0.062 mole) of methyl 7-benzyloxy-2,3-dihydro - 1-oxo-1H-pyrrolo[1,2-a]indole-2-carboxylate in 1600 ml. of 95% acetic acid is heated at reflux temperature for 16 hours. Isolation of the product as described for the 7-hydrogen ketone (Example 3) gives 45.0 g. (85% yield) of shiny plates, M.P. 186–188° C.

EXAMPLE 5

*Preparation of 2,3-dihydro-1H-pyrrolo[1,2-a]indole*

A mixture of 5.42 g. (31.7 mmole) of 2,3-dihydro-1-oxo-1H-pyrrolo[1,2-a]indole, 5.61 g. (excess) of potassium hydroxide, 4.3 ml. (excess) of hydrazine hydrate and 100 ml. of diethylene glycol is heated at reflux temperature for 1.5 hour. It is then cooled and treated with water and methylene chloride. The methylene chloride layer is washed with water, dried and concentrated. The residue is extracted with boiling methanol and this extract is filtered to remove some insoluble white solid. Concentration and cooling of the extract afford first a yellow oil. The supernatant is decanted and cooled, yielding in several crops 2.36 g. (48%) of 2,3-dihydro-1H-pyrrolo[1,2-a]indole, white prisms, M.P. 72–75° C.

EXAMPLE 6

*Preparation of 7-benzyloxy-2,3-dihydro-1H-pyrrolo[1,2-a]indole*

A mixture of 831 mg. (3.0 mmoles) of 7-benzyloxy-2,3-dihydro-1-oxo-1H-pyrrolo[1,2-a]indole, 0.4 ml. of hydrazine hydrate, 560 mg. of potassium hydroxide and 10 ml. of diethylene glycol is heated at reflux temperature for 4 hours. The cooled mixture is poured into water and extracted with methylene chloride. The dried extract is evaporated, and the residue is dissolved in benzene and passed through a Florisil column. The solid in the first 50 ml. of eluate is recrystallized from acetone-petroleum ether (B.P. 60–70° C.) to give 0.207 g. (27%) of white crystals, M.P. 147–150° C. Three recrystallizations from methanol gives white crystals, M.P. 150–152° C.

EXAMPLE 7

*Preparation of 2,3-dihydro-9-formyl-1H-pyrrolo[1,2-a]indole*

To an ice-cooled mixture of 4 ml. of dimethylformamide and 767 mg. (5.0 mmole, 0.46 ml.) of phosphorous oxychloride is added a solution of 785 mg. (5.0 mmole) of 2,3-dihydro-1H-pyrrolo[1,2-a]indole in 15 ml. of dimethylformamide. The resulting solution is allowed to warm to ambient temperature over 2 hours, then poured into water and treated with 10% sodium hydroxide solution. The solid that formed is washed with water and dissolved in methylene chloride. This solution is washed with water, dried and concentrated and the residue is crystallized from methanol (charcoal). This procedure affords 548 mg. (59%) of 2,3-dihydro-9-formyl-1H-pyrrolo[1,2-a]indole, pale yellow needles, M.P. 145–151° C.

EXAMPLE 8

*Preparation of 7-benzyloxy-9-formyl-2,3-dihydro-1H-pyrrolo[1,2-a]indole*

To 0.5 ml. of ice-cooled dimethylformamide is added 71 mg. (0.47 mmole) of freshly distilled phosphorus oxychloride. The mixture is stirred and cooled for 15 minutes then treated with a suspension of 122 mg. (0.47 mmole) of 7-benzyloxy-2,3-dihydro-1H - pyrrolo[1,2-a]indole in 2 ml. of dimethylformamide. The yellow solution that forms is stirred at 35° C. for 1 hour, then poured onto ice. A pink solid starting material that forms is collected on a filter. The filtrate is made alkaline with dilute sodium hydroxide solution and the pale yellow solid that forms is washed with water and dried. In this manner there is 65 mg. (48%) of 7-benzyloxy-9-formyl-2,3-dihydro-1H-pyrrolo[1,2-a]indole, M.P. 157° C.

EXAMPLE 9

*Preparation of 2,3-dihydro-9-(β-nitrovinyl)-1H-pyrrolo[1,2-a]indole*

A mixture of 1.85 g. of 9-formyl-2,3-dihydro-1H-pyrrolo[1,2-a]indole, 300 mg. of ammonium acetate and 5 ml. of nitromethane is heated at reflux temperature for 1 hour, cooled, and the crystals that form are washed with hot water and dissolved in methylene chloride. This solution is dried and concentrated on a steam bath as methanol is added. Cooling the solution when the first crystals appear gives 1.56 g. (73%) of 2,3-dihydro-9-(β-nitrovinyl) - 1H-pyrrolo[1,2-a]indole, orange prisms, melting point 182–184° C.

EXAMPLE 10

*Preparation of 7-benzyloxy-2,3-dihydro-9-(β-nitrovinyl)1H-pyrrolo[1,2-a]indole*

A mixture of 500 mg. of 7-benzyloxy-2,3-dihydro-9-formyl-1H-pyrrolo[1,2-a]indole, 120 mg. of ammonium acetate and 1.0 ml. of nitromethane affords under the usual conditions 300 mg. (52%) of 7-benzyloxy-2,3-dihydro-9-(β-nitrovinyl)-1H-pyrrolo[1,2-a]indole as golden prisms, melting point 169–171° C.

EXAMPLE 11

*Preparation of 9-(β-aminoethyl)2,3-dihydro-1H-pyrrolo[1,2-a]indole*

To a stirred suspension of 1.60 g. (42 mmole) of lithium aluminum hydride in 40 ml. of tetrahydrofuran is added a suspension of 1.22 g. (5.4 mmole) of 2,3-dihydro-9-(β-nitrovinyl)-1H-pyrrolo[1,2-a]indole in 40 ml. of tetrahydrofuran. After the mixture is stirred 20 hours at ambient temperature it is treated with water and filtered. The filter cake is washed with tetrahydrofuran and the combined filtrate and wash is concentrated. The white solid residue has λmax 275, 283, 292 mμ.

EXAMPLE 12

*Preparation of 9-(β-aminoethyl)-2,3-dihydro-1H-pyrrolo[1,2-a]indole hydrochloride*

An ether solution of 1-(β-aminoethyl)-2,3-dihydro-1H-pyrrolo[1,2-a]indole is treated with anhydrous hydrogen chloride until no further formation of precipitate is observed. This procedure affords 570 mg. (45%) of 9-(β-aminoethyl) - 2,3-dihydro-1H-pyrrolo[1,2-a]indole hydrochloride, melting point 210–220° C. dec.

EXAMPLE 13

*Preparation of 9-(β-aminoethyl)-7-benzyloxy-2,3-dihydro-1H-pyrrolo[1,2-a]indole*

Treatment of 708 mg. of 7-benzyloxy-2,3-dihydro-9-(β-nitrovinyl)-1H-pyrrolo[1,2-a]indole in 20 ml. of tetrahydrofuran with 630 mg. of lithium aluminum hydride in 25 ml. of tetrahydrofuran in the usual manner affords 9-(β-aminoethyl) - 7-benzyloxy-2,3-dihydro - 1H-pyrrolo[1,2-a]indole as white solid.

EXAMPLE 14

*Preparation of 9-(β-aminoethyl)-7-benzyloxy-2,3-dihydro-1H-pyrrolo[1,2-a]indole hydrochloride*

Treatment of a solution of 9-(β-aminoethyl)-7-benzyloxy-2,3-dihydro-1H-pyrrolo[1,2-a]indole with anhydrous hydrogen chloride affords 9-(β-aminoethyl)-7-benzyloxy-2,3-dihydro-1H-pyrrolo[1,2-a]indole hydrochloride, melting point 80° C. dec.

EXAMPLE 15

*Preparation of 9-(β-aminoethyl)-7-hydroxy-2,3-dihydro-1H-pyrrolo[1,2-a]indole hydrochloride*

A solution of 1.0 g. of 9-(β-aminoethyl)-7-benzyloxy-2,3-dihydro-1H-pyrrolo[1,2-a]indole hydrochloride in 100 ml. of methanol is treated with 1.0 g. of 10% palladium on charcoal and the resulting mixture is shaken overnight in a Parr apparatus with hydrogen at an initial pressure of 33.5 p.s.i. It is then filtered and the filtrate is concentrated. The tan solid residue of 9-(β-aminoethyl)-2,3-dihydro-7-hydroxy-1H - pyrrolo[1,2-a]indole hydrochloride obtained in 0.53 g. (72%) yield, has M.P. 110–113° C.

EXAMPLE 16

*Preparation of 9-(β-aminoethyl)-7-methoxy-2,3-dihydro-1H-pyrrolo[1,2-a]indole*

A solution of 610 mg. of 9-(β-aminoethyl)-7-hydroxy-2,3-dihydro-1H-pyrrolo[1,2-a]indole hydrochloride (Example 15) in 8 ml. of water is treated with 2 ml. of 10% sodium hydroxide solution and 0.27 ml. of dimethyl sulfate and the mixture is warmed at 50° C. for 2 hours. It is cooled and extracted with methylene chloride. This extract is dried and concentrated to give off-white solid, λmax 275, 283, 292 mμ.

EXAMPLE 17

*Preparation of 9-(β-aminoethyl)-7-methoxy-2,3-dihydro-1H-pyrrolo[1,2-a]indole hydrochloride*

Treatment of a methylene chloride solution of 9-(β-aminoethyl) - 7-methoxy-2,3-dihydro-1H - pyrrolo[1,2-a] indole (Example 16) with anhydrous hydrogen chloride in ether gives light grey solid that turns to a glass on exposure to air; λmax. 284, 300, 315 mμ.

What is claimed is:
1. A compound selected from the group consisting of 2,3-dihydro-1H-pyrrolo[1,2-a]indole of the formula:

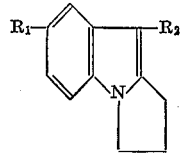

wherein $R_1$ is selected from the group consisting of hydrogen, hydroxy, lower alkoxy and phenyl lower alkoxy and $R_2$ is selected from the group consisting of β-nitrovinyl and β-aminoethyl; and the non-toxic pharmaceutically acceptable acid-addition salts thereof.

2. 9-(β-nitrovinyl) - 2,3-dihydro - 1H-pyrrolo[1,2-a]-indole.

3. 9-(β-aminoethyl)-2,3 - dihydro-1H-pyrrolo[1,2-a]indole.

4. 7-hydroxy-9-(β-nitrovinyl) - 2,3-dihydro-1H-pyrrolo[1,2-a]indole.

5. 7-hydroxy-9 - (β-aminoethyl)-2,3 - dihydro-1H-pyrrolo[1,2-a]indole.

6. 7-methoxy-9-(β-nitrovinyl) - 2,3-dihydro-1H-pyrrolo[1,2-a]indole.

7. 7-methoxy - 9-(β-aminoethyl)-2,3 - dihydro-1H-pyrrolo[1,2-a]indole.

8. 7-ethoxy-9 - (β-nitrovinyl)2,3 - dihydro-1H-pyrrolo[1,2-a]indole.

9. 7-ethoxy-9 - (β-aminoethyl)2,3-dihydro - 1H-pyrrolo[1,2-a]indole.

10. 7-benxyloxy-9 - (β-nitrovinyl)2,3 - dihydro-1H-pyrrolo[1,2-a]indole.

11. 7-benzyloxy-9 - (β-aminoethyl) - 2,3-dihydro- 1H-pyrrolo[1,2-a]indole.

12. 7-phenethoxy-9 - (β-nitrovinyl) - 2,3-dihydro-1H-pyrrolo[1,2-a]indole.

13. 7-phenethoxy-9 - (β-aminoethyl) - 2,3-dihydro-1H-pyrrolo[1,2-a]indole.

No references cited.

HENRY R. JILES, *Acting Primary Examiner.*

MARY O'BRIEN, *Assistant Examiner.*